(12) United States Patent
Hsiao

(10) Patent No.: US 7,637,431 B2
(45) Date of Patent: Dec. 29, 2009

(54) OPTICAL SYSTEM

(75) Inventor: Ting-Hao Hsiao, Luchou (TW)

(73) Assignee: Marson Technology Co., Ltd., Taipei Hsien (TW)

( * ) Notice: Subject to any disclaimer, the term of this patent is extended or adjusted under 35 U.S.C. 154(b) by 291 days.

(21) Appl. No.: 11/696,191

(22) Filed: Apr. 4, 2007

(65) Prior Publication Data

US 2007/0181690 A1    Aug. 9, 2007

Related U.S. Application Data

(63) Continuation-in-part of application No. 11/160,763, filed on Jul. 7, 2005, now abandoned.

(51) Int. Cl.
*G02B 5/00* (2006.01)
*G02B 5/08* (2006.01)
*G02B 26/00* (2006.01)
*G06K 7/10* (2006.01)

(52) U.S. Cl. .................. 235/462.32; 235/462.06; 235/462.14; 235/462.35; 235/462.42; 235/462.43; 235/462.45; 235/462.49; 235/472.01; 235/472.02; 235/472.03

(58) Field of Classification Search ............ 235/462.32, 235/462.35, 462.42, 462.43, 462.45, 462.46, 235/462.49, 472.01, 472.02, 742.03, 462.06, 235/461.14, 472.03
See application file for complete search history.

(56) References Cited

U.S. PATENT DOCUMENTS

| | | | |
|---|---|---|---|
| 6,385,352 B1 * | 5/2002 | Roustaei | 382/324 |
| 6,708,888 B2 * | 3/2004 | Liou et al. | 235/462.45 |
| 2008/0035733 A1 * | 2/2008 | Vinogradov et al. | 235/462.42 |

* cited by examiner

*Primary Examiner*—Thien M. Le
*Assistant Examiner*—Tuyen K Vo

(57) ABSTRACT

An optical system used in a barcode scanner is disclosed to include a lens, two LEDs arranged at two sides of the lens, two condensers arranged in front of the LEDs, and two curved reflectors with multiple curvatures for reflecting a major part of light from the LEDs through the condensers onto the left and right sides of an image mapping surface on a barcode and a minor part of light onto the center area of the image mapping surface so that the receiving characteristic of the lens can pick up an evenly distributed bright image from the image mapping surface on the barcode and the posterior image processing of the barcode scanner can obtain a strong and clear image signal to facilitate barcode and to increase recognition rate and accuracy.

6 Claims, 7 Drawing Sheets

OPTICAL SYSTEM

This application is a Continuation-In-Part of my patent application, Ser. No. 11/160,763, filed on Jul. 7, 2005.

BACKGROUND OF THE INVENTION

1. Field of the Invention

The present invention relates to a barcode scanner and more specifically, to an optical system for barcode scanner, which enhances the brightness on the left and right sides of the image mapping surface on the barcode so that the lens can pick up a clear and bright barcode image.

2. Description of the Related Art

In the modern multimedia era, information exchange among people is popular, and the demand of people for information is more and more heavy. Rising of the new markets and fast developing and application of new technology bring prosperity for optical input devices. For the sake of commercial and industrial automation, barcodes have been intensively used to label a variety of products, tools and equipments, and barcode reading devices, i.e., barcode scanners are used to read barcodes on these products, tools and equipments by means of approaching the machine to the object or the object to the machine.

FIGS. 5 and 6 illustrates the light emitting device and lens of an optical system for barcode scanner according to the prior art. When the light source A is emitting light onto the barcode (not shown), the center area of the barcode image has a relatively higher brightness and the two opposite lateral areas of the barcode image have a relatively lower brightness. This uneven brightness of the barcode image may produce a weak image signal, resulting in a reading error or failure. Further, when the lens B picks up the barcode image, the receiving characteristic of relatively wider center receiving area and relatively narrower lateral receiving area of the lens makes the aforesaid unevenly distributed image brightness problem worse. In order to eliminate this problem, a light shade film B1 may be attached to the surface of the lens B to shade a part of the center area so that the lens B can obtain a barcode image having an evenly distributed brightness for accurate barcode reading. However, the image obtained in this light shading manner is relatively darkened, and the aforesaid reading error or failure problem may still occur. Further, the light source A will have a light attenuation problem after a long use. When the light source A starts to attenuate, the barcode image obtained by the lens B will be more darkened and unreadable, thereby shortening the working life of the barcode scanner and increasing the user's cost of use.

FIG. 7 shows another design of optical system used in a barcode scanner according to the prior art. According to this design, the light emitting direction of the light source A in the barcode scanner C is not in parallel to the scanning direction of the lens B but at an angle θ about 15°. Because the light emitting direction of the light source A and the scanning direction of the lens B are not in parallel, a part of light rays is dispersed when the light source A is emitting light onto the barcode. Therefore, the light source A must use multiple rows of light emitting devices to light a big area so as to obtain an even brightness on the X-Y plane. Further, when scanning, the light source A must be kept in proximity to the barcode. The precision arrangement of the multiple rows of light emitting devices greatly increases the cost of the barcode scanner.

FIGS. 8 and 9 show still another design of optical system for barcode scanner according to the prior art. According to this design, a diffraction grating D is used to diffuse light evenly. This arrangement can only distribute light evenly. Further, a certain distance must be kept between the condenser E and the light source A to obtain a satisfactory condensing effect. This arrangement requires much inside space of the scanner, i.e., the barcode scanner cannot be small-sized. Further, the use of multiple sets of light emitting devices for the light source A also increases the cost of the barcode scanner.

Therefore, it is desirable to provide an optical system for barcode scanner that eliminates the aforesaid problems.

SUMMARY OF THE INVENTION

The present invention has been accomplished under the circumstances in view. It is one object of the present invention to provide an optical system for barcode scanner, which enables the barcode scanner to obtain a clear and bright image signal for accurate reading. It is another object of the present invention to provide an optical system for barcode scanner, which has a simple structure and requires less installation space so that the barcode scanner can be small-sized.

To achieve these and other objects of the present invention, the optical system is used in a barcode scanner, comprising an image forming lens that forms an image mapping surface on a barcode and picks up the image of the image mapping surface, two light emitting diodes transversely arranged at two opposite lateral sides relative to the image forming lens and respectively aimed at the image forming lens, two condensers respectively arranged in parallel to the light emitting devices, and two curved reflectors respectively arranged adjacent to the two light emitting diodes. The curved reflectors each have a curved reflecting surface and are so arranged that the curved reflectors reflect a major part of light from the light emitting devices through the condensers onto left and right sides of the image mapping surface formed by the image forming lens on the barcode and a minor part of light from the light emitting devices through the condensers onto a center part of the image mapping surface formed by the image forming lens on the barcode.

When the image forming lens picks up the image of the barcode from the image mapping surface, the receiving characteristic of relatively wider center area and relatively narrower lateral area of the image forming lens allows for a relatively larger amount of incident light to go through the center area of the image forming lens and a relatively smaller amount of incident light to go through the left and right lateral areas of the image forming lens. Therefore, when the image forming lens picked up the image of the barcode from the image mapping surface and mapped the image on the image forming surface, the image formed on the image forming surface shows a high and evenly distributed brightness, so that the posterior image processing of the barcode scanner can obtain a strong and clear image signal to facilitate reading of the barcode content, thereby improving recognition rate and accuracy.

Further, the curved reflectors as well as the light emitting devices are respectively arranged at two opposite lateral sides relative to the image forming lens, and the light path of the light emitted by the light emitting devices onto the curved reflectors is in parallel to the scanning path of the image forming lens. Thus, when reflected light is condensed onto the barcode, the barcode is brightly radiated, eliminating the drawback of the conventional design in which the light from the light source is not in parallel to the scanning direction of the image forming lens and forms with the scanning direction of the image forming lens an included angle at the barcode to shade a major part of the reflected light from entering the image forming lens.

DETAILED DESCRIPTION OF THE PREFERRED EMBODIMENT

Figure 1:
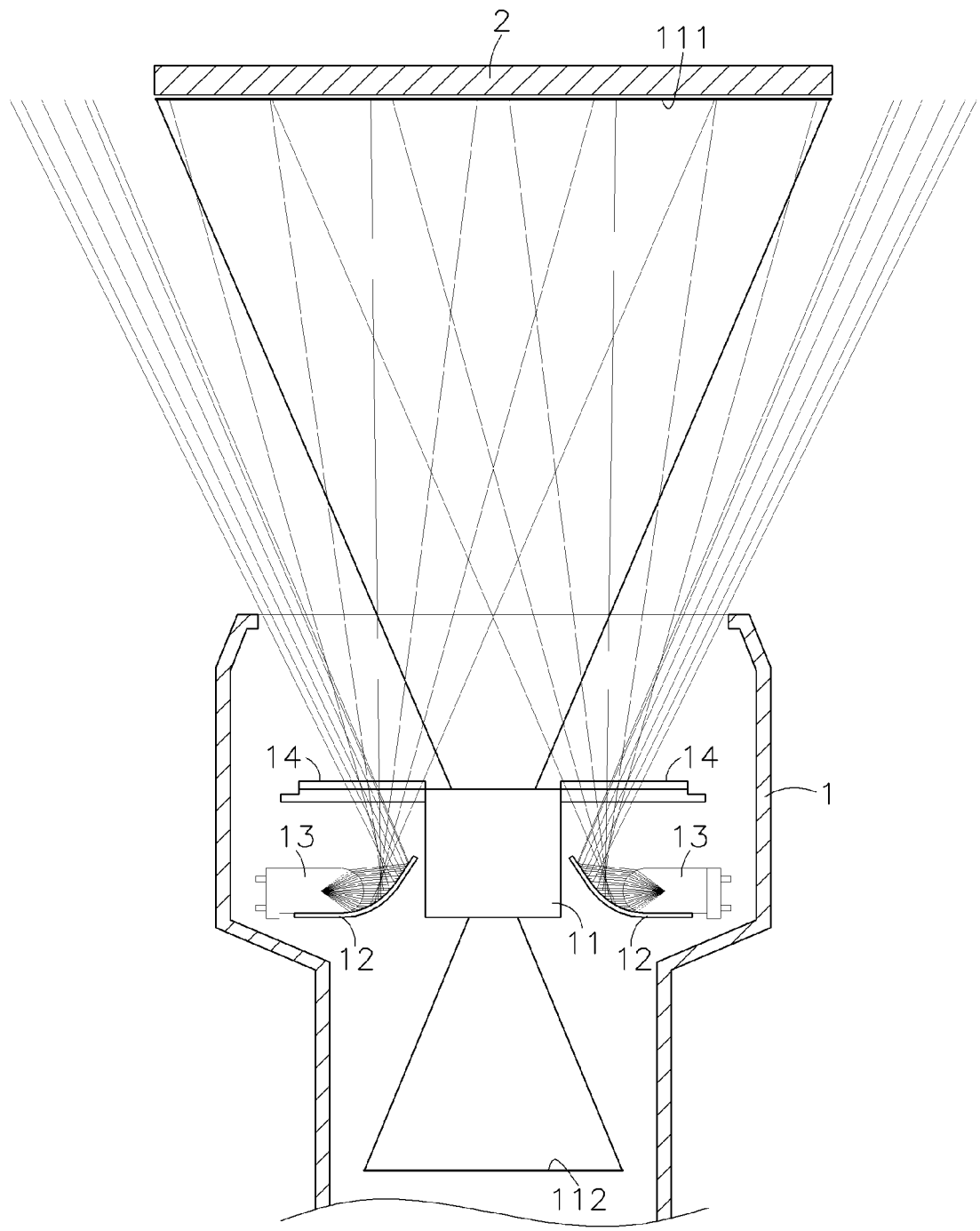
FIG. 1 is a schematic top view of an optical system used in a barcode scanner according to the present invention.
Figure 2:
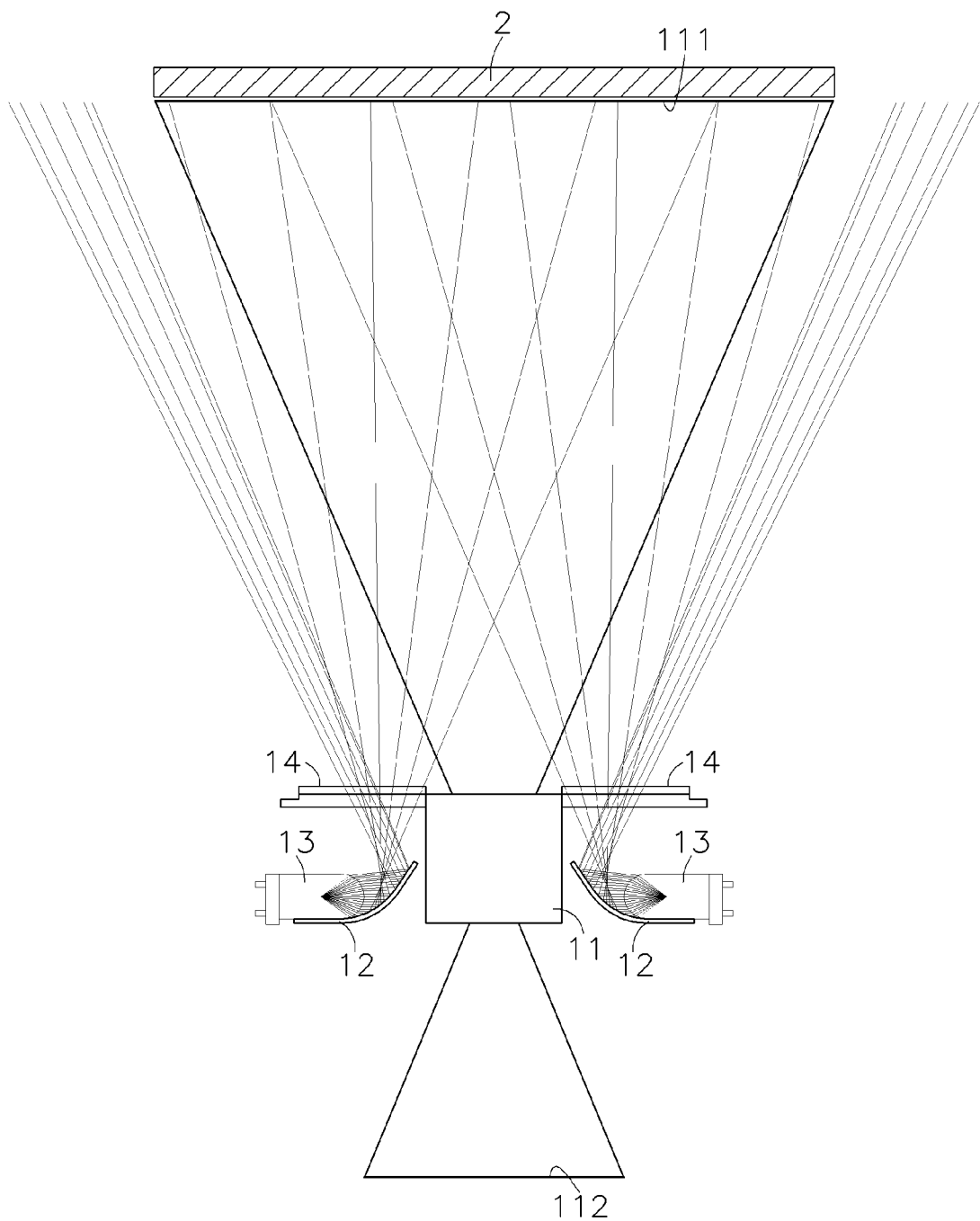
FIG. 2 is a schematic drawing of the present invention, showing the optical system in operation.
Figure 3:
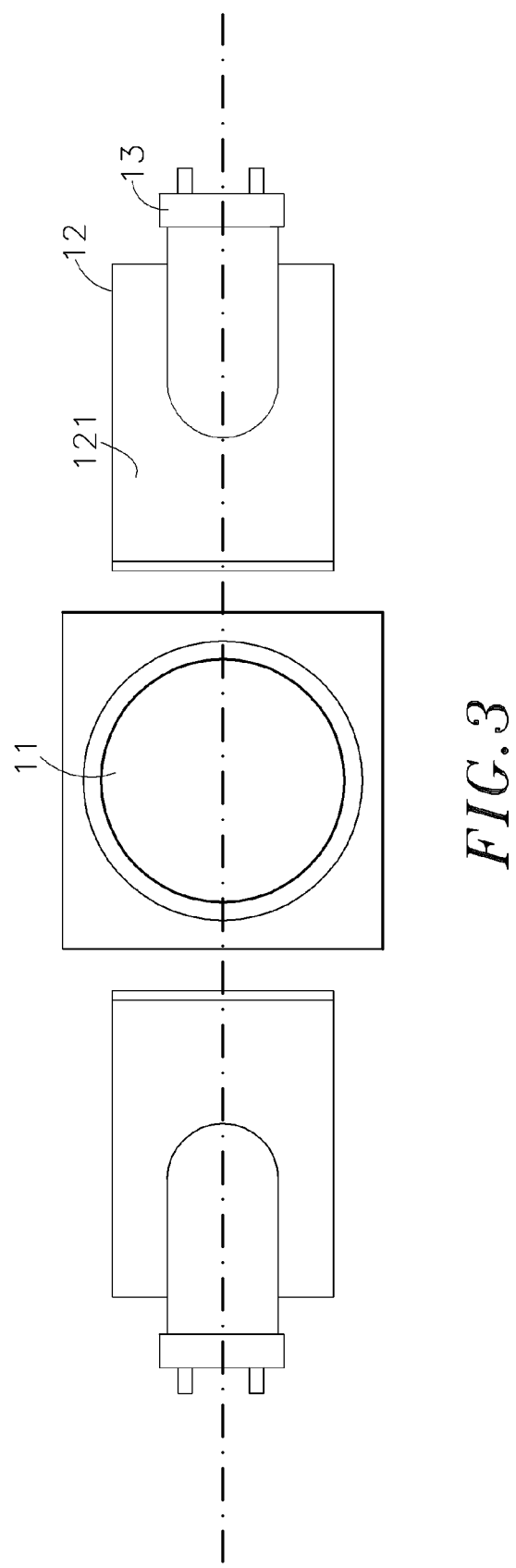
FIG. 3 is a schematic front view of the optical system according to the present invention.
Figure 4:
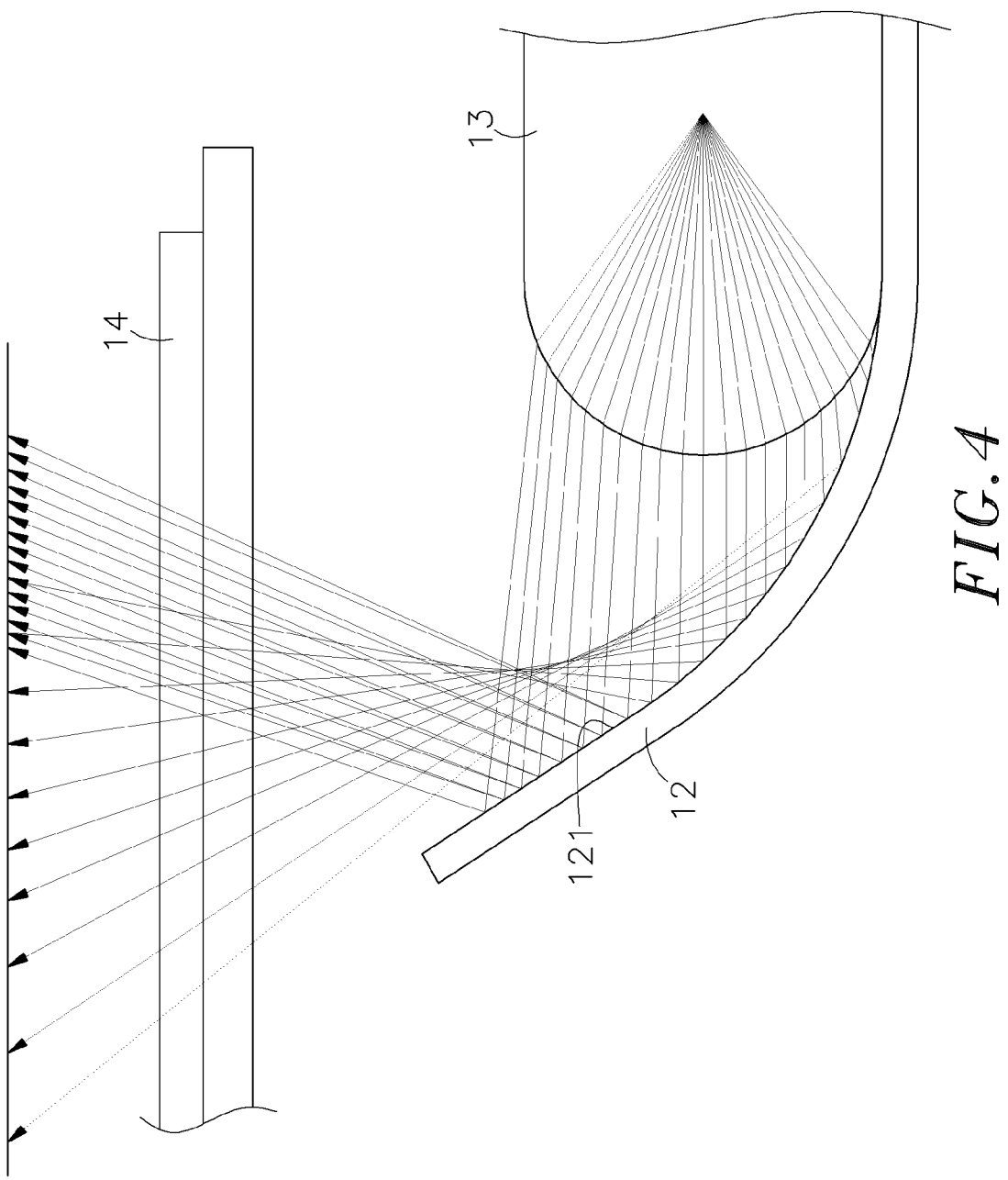
FIG. 4 is an enlarged view of a part of FIG. 2.
Figure 5:
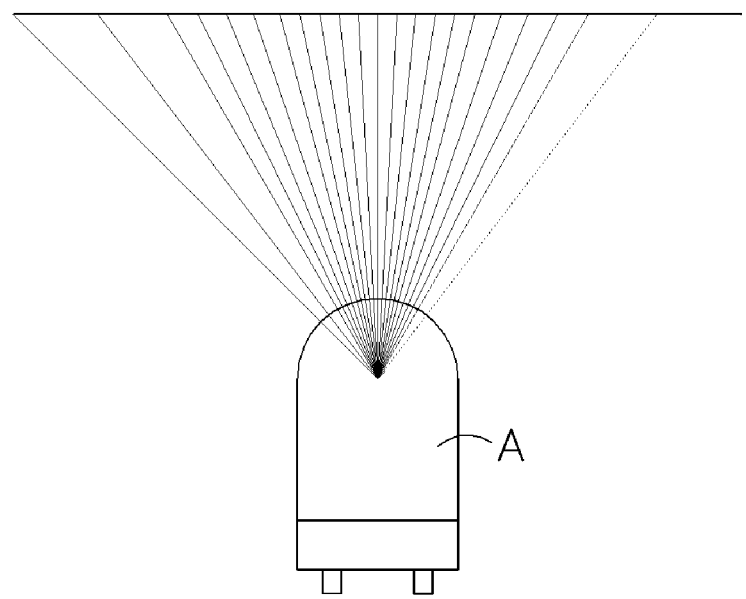
FIG. 5 is a schematic drawing showing the light emitting status of a light emitting device according to the prior art.
Figure 6:
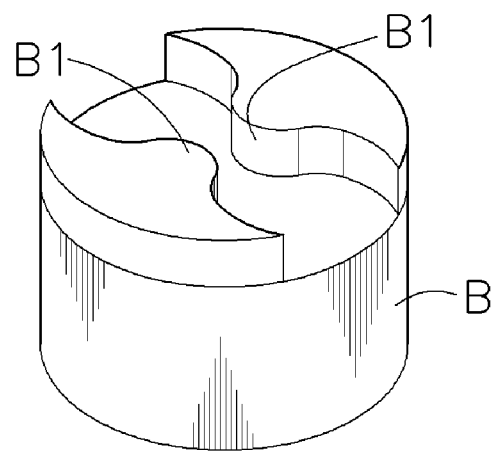
FIG. 6 is an elevational view of an image forming lens used in a barcode scanner according to the prior art.
Figure 7:
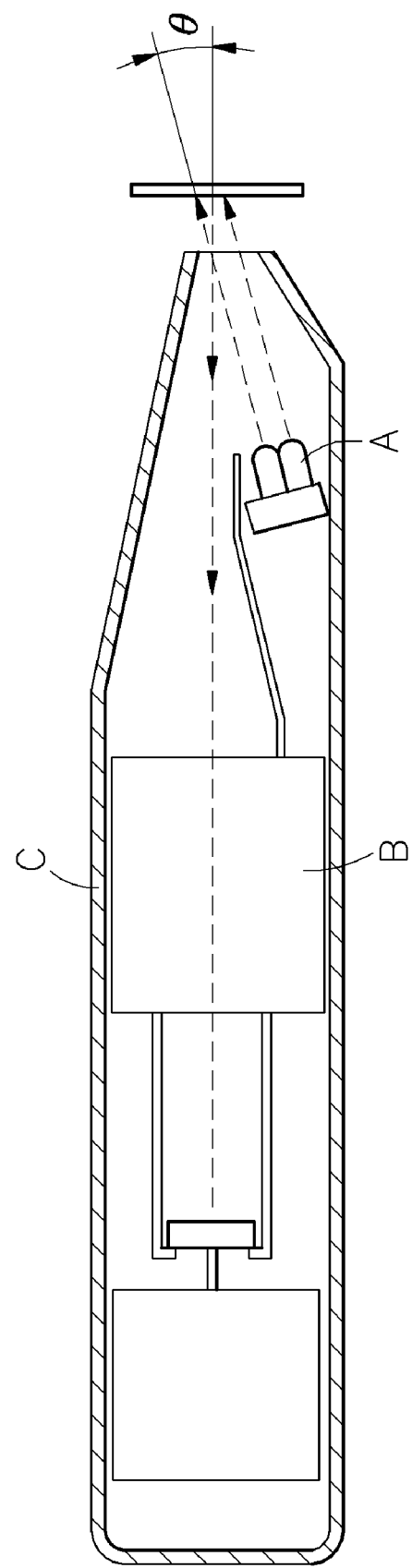
FIG. 7 is a schematic drawing showing another design of optical system in a barcode scanner according to the prior art.
Figure 8:
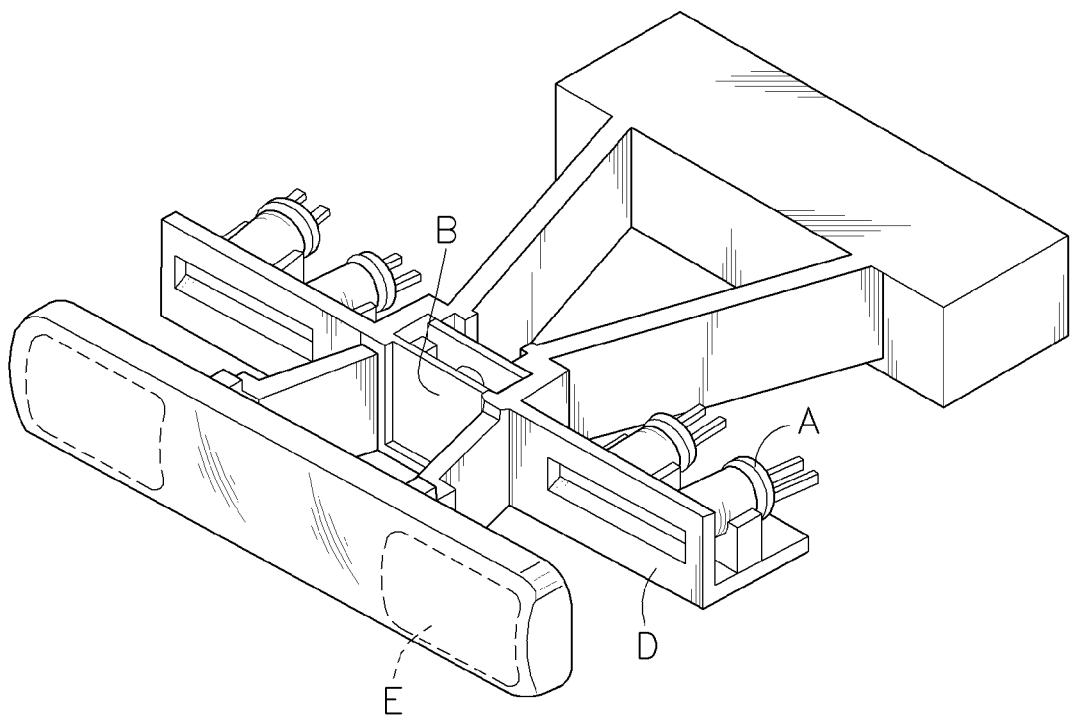
FIG. 8 is a perspective view of still another design of optical system for barcode scanner according to the prior art.
Figure 9:
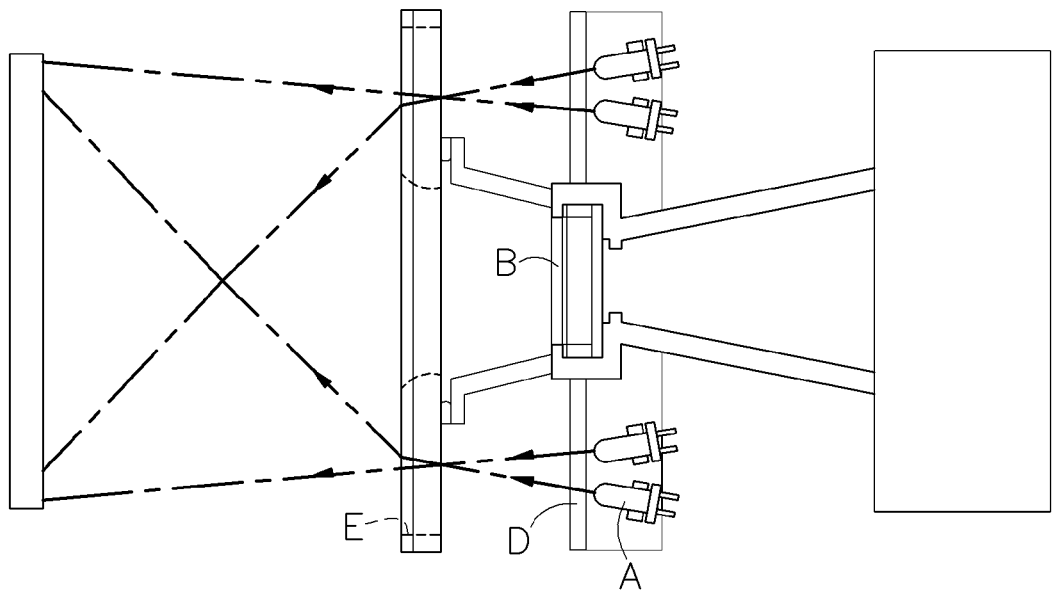
FIG. 9 is a schematic drawing showing the optical system of FIG. 8 in operation.

Referring to FIGS. 1~4, an optical system in accordance with the present invention is shown used in a barcode scanner 1, comprising an image forming lens 11, two curved reflectors 12, two light emitting devices 13, and two condensers 14.

The image forming lens 11 can pick up the image of a barcode 2 in front of the barcode scanner 1. The image forming lens 11 forms an image mapping surface 111 on the barcode 2, and forms an image of the image mapping surface 111 on the barcode 2 onto an image forming surface 112. The curved reflectors 12 are respectively arranged at two opposite lateral sides relative to the image forming lens 11. The curved reflectors 12 respectively curve toward the image forming lens 11, each having a curved reflecting surface 121 that has multiple curvatures corresponding to the left or right side of the image mapping surface 111 on the barcode 2. The light emitting devices 13 are respectively arranged adjacent to the curved reflectors 12 and extending in direction toward the image forming lens 11 for emitting light onto the curved reflecting surfaces 121 of the curved reflectors 12 respectively. The condensers 14 are respectively arranged in the light paths of the reflective light of the curved reflectors 12. Further, the light emitting devices 13 can be light emitting diodes or laser diodes.

When the barcode scanner 1 is in use, the light emitting devices 13 respectively emit light in direction toward the two opposite lateral sides of the image forming lens 11, and the light rays from the light emitting devices 13 are respectively radiated at the curved reflecting surfaces 121 of the curved reflectors 12. Thus, the curved reflecting surfaces 121 of the curved reflectors 12 reflect the light rays through the condensers 14, which in turn condense the light rays onto the image mapping surface 111 on the barcode 2.

Due to the reflecting effect of the curved reflecting surfaces 121 that have multiple curvatures, the light intensity at the left and right side areas of the image mapping surface 111 on the barcode 2 is higher than the light intensity at the center area of the image mapping surface 111 on the barcode 2. When the image forming lens 11 picks up the image of the barcode 2 from the image mapping surface 111, the receiving characteristic of relatively wider center receiving area and relatively narrower lateral receiving area of the image forming lens 11 allows for a relatively larger amount of incident light to go through the center area of the image forming lens 11 and a relatively smaller amount of incident light to go through the left and right lateral areas of the image forming lens 11. The brightness distribution condition of light at the image mapping surface 111, in which the light intensity at the left and right side areas of the image mapping surface 111 on the barcode 2 is higher than the light intensity at the center area of the image mapping surface 111 on the barcode 2, and the receiving characteristic of the image forming lens 11 are in complementation. Therefore, when the image forming lens 11 picked up the image of the barcode 2 from the image mapping surface 111 and mapped the image on the image forming surface 112, the image formed on the image forming surface 112 shows a high and evenly distributed brightness, so that the posterior image processing of the barcode scanner 1 can obtain a strong and clear image signal to facilitate reading of the barcode content, thereby improving recognition rate and accuracy.

Further, the curved reflectors 12 as well as the light emitting devices 13 are respectively arranged at two opposite lateral sides relative to the image forming lens 11, and the light path of the light emitted by the light emitting devices 13 onto the curved reflectors 12 is in parallel to the scanning path of the image forming lens 11. Thus, when reflected light is condensed onto the barcode 2, the barcode 2 is brightly radiated, eliminating the drawback of the conventional design in which the light from the light source is not in parallel to the scanning direction of the image forming lens and forms with the scanning direction of the image forming lens an included angle at the barcode to shade a major part of the reflected light from entering the image forming lens. Further, the design of the present invention allows each light emitting device to be set transversely close to one side of the associating curved reflector to shorten the light path between each light emitting device and the associating curved reflector and to save the installation space of the parts in the barcode scanner 1, and therefore the size of the whole barcode scanner 1 can be minimized.

Further, the condensers 14 condense reflected light from the curved reflecting surfaces 121 of the curved reflectors 12 into a bar of light that fits the height of the barcode 2, therefore light rays can be effectively gathered onto the barcode 2 to enhance the brightness of the barcode 2, for enabling the image forming lens 11 to pick up a bright image from the barcode 2.

Further, the curved reflecting surfaces 121 of the curved reflectors 12 reflect light at different angles. The multiple curvatures of the curved reflecting surfaces 121 of the curved reflectors 12 may be modified to fit different requirements or designs from different users without departing from the concept of giving more light to the left and right sides and less light to the center area.

In general, the invention improves the prior design by means of the following features:

1. By means of the multiple curvatures of the curved reflecting surfaces 121 of the curved reflectors 12, the curved reflectors 12 reflect a major part of light from the light emitting devices 13 onto the left and right side areas of the image mapping surface 111 on the barcode 2 and a minor part of light from the light emitting devices 13 onto the center area of the image mapping surface 111 on the barcode 2, therefore the light intensity at the left and right side areas of the image mapping surface 111 on the barcode 2 is higher than the light intensity at the center area of the image mapping surface 111 on the barcode 2. When the image forming lens 11 picks up the image of the barcode 2 from the image mapping surface 111, the receiving characteristic of relatively wider center area and relatively narrower lateral area of the image forming lens 11 allows for a relatively larger amount of incident light to go through the center area of the image forming lens 11 and a relatively smaller amount of incident light to go through the left and right lateral areas of the image forming lens 11. Therefore, when the image forming lens 11 picked up the image of the barcode 2 from the image mapping surface 111 and mapped the image on the image forming surface 112, the image formed on the image forming surface 112 shows a high and evenly distributed brightness, so that the posterior image processing of the barcode scanner 1 can obtain a strong and clear image signal to facilitate reading of the barcode content, thereby improving recognition rate and accuracy.

2. The design of the present invention allows each light emitting device 13 to be set transversely close to one side of the associating curved reflector 12 to shorten the light path between each light emitting device 12 and the associating curved reflector 13. This design does not need a complicated arrangement of the component parts or calculation of the angles of light rays, thereby saving much the installation space of the parts in the barcode scanner 1, and therefore the size of the whole barcode scanner 1 can be minimized.

3. The curved reflectors 12 as well as the light emitting devices 13 are respectively arranged at two opposite lateral sides relative to the image forming lens 11, and the light path of the light emitted by the light emitting devices 13 onto the curved reflectors 12 is in parallel to the scanning path of the image forming lens 11. Thus, when reflected light is condensed onto the barcode 2, the barcode 2 is brightly radiated, eliminating the drawback of the conventional design in which the light from the light source is not in parallel to the scanning direction of the image forming lens and forms with the scanning direction of the image forming lens an included angle at the barcode to shade a major part of the reflected light from entering the image forming lens.

A prototype of optical system has been constructed with the features of the annexed drawings of FIGS. 1~4. The optical system functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An optical system used in a barcode scanner, comprising an image forming lens, light source means, reflector means adapted to reflect light from said light source means, and condenser means adapted to condense reflected light from said reflector means onto a barcode for enabling said image forming lens to pick up the image of the barcode, wherein: said image forming lens forms an image mapping surface on the barcode and picks up the image of said image mapping surface; said light source means comprises two light emitting diodes transversely arranged at two opposite lateral sides relative to said image forming lens and respectively aimed at said image forming lens; said condenser means comprises two condensers respectively arranged in parallel to said light emitting devices; said reflector means comprises two curved reflectors respectively arranged adjacent to said two light emitting devices, said curved reflectors each having a curved reflecting surface so that said curved reflectors reflect a light from said light emitting devices through said condensers onto the image mapping surface formed by said image forming lens on the barcode such that left and right sides of the image mapping surface is brighter than a center part thereof.

2. The optical system as claimed in claim 1, wherein said light emitting devices are light emitting diodes.

3. The optical system as claimed in claim 1, wherein said light emitting devices are laser diodes.

4. The optical system as claimed in claim 1, wherein the curved reflecting surfaces of said curved reflectors each have multiple curvatures.

5. The optical system as claimed in claim 1, wherein said condensers condense reflected light from said curved reflectors into a bar of light corresponds to the height of the image mapping surface formed by said image forming lens on the barcode.

6. The optical system as claimed in claim 1, wherein the light path of the light emitted by said light emitting devices onto said curved reflectors is in parallel to the scanning path of said image forming lens.

* * * * *